United States Patent [19]
Laszewski et al.

[11] Patent Number: 5,743,948
[45] Date of Patent: Apr. 28, 1998

[54] METHOD FOR CONTINUOUS PRODUCTION OF VARNISH

[75] Inventors: Greg A. Laszewski, Wauwatosa; Sunil M. Rao, Hubertus, both of Wis.

[73] Assignee: Chemical Research Technology, Sussex, Wis.

[21] Appl. No.: 644,868

[22] Filed: May 10, 1996

Related U.S. Application Data

[63] Continuation-in-part of Ser. No. 603,203, Feb. 20, 1996, and Ser. No. 278,403, Jul. 21, 1994, abandoned.
[51] Int. Cl.$^6$ ................................................ C09D 191/00
[52] U.S. Cl. ................................................ 106/244
[58] Field of Search ................................................ 106/244

[56] References Cited

U.S. PATENT DOCUMENTS

| | | | |
|---|---|---|---|
| 4,474,473 | 10/1984 | Higuchi et al. | 366/75 |
| 5,151,026 | 9/1992 | Anderson et al. | 425/204 |

FOREIGN PATENT DOCUMENTS

| | | |
|---|---|---|
| 0520901A1 | 12/1992 | European Pat. Off. . |
| 233134A1 | 12/1984 | Germany . |
| 1563588 | 3/1977 | United Kingdom . |

OTHER PUBLICATIONS

Aluminum Gellants for Printing Inks; Bulletin No. TDA-2; *Chattem Chemicals* no date avail.
Chemistry of Aluminum–Organics in the Preparation of Ink Vehicles and Gel Varnishes; Dr. John E. Vincent; American Ink Maker; Oct., 1984.
Plant Design and Economics for Chemical Engineers; Max Stone Peters et al.; at 33–34, McGraw–Hill, Inc., (1980) no month avail.

*Primary Examiner*—David Brunsman
*Attorney, Agent, or Firm*—Michael, Best & Friedrich

[57] ABSTRACT

A method for the production of varnish, the method including the steps of: (a) continuously introducing resin, oil and a gelling agent into a mixing zone of an extruder; (b) heating the resin, oil, and gelling agent to a first elevated temperature in the mixing zone of the extruder; (c) mixing the resin, oil, and gelling agent in the mixing zone of the extruder for a first period sufficient to produce varnish; (d) continuously withdrawing the varnish from the mixing zone of the extruder; (e) continuously introducing the varnish into a holding zone; (f) maintaining the varnish at an elevated temperature in the holding zone for a second period, the second period being longer than the first period; and (g) continuously withdrawing the varnish from the holding zone.

21 Claims, 2 Drawing Sheets

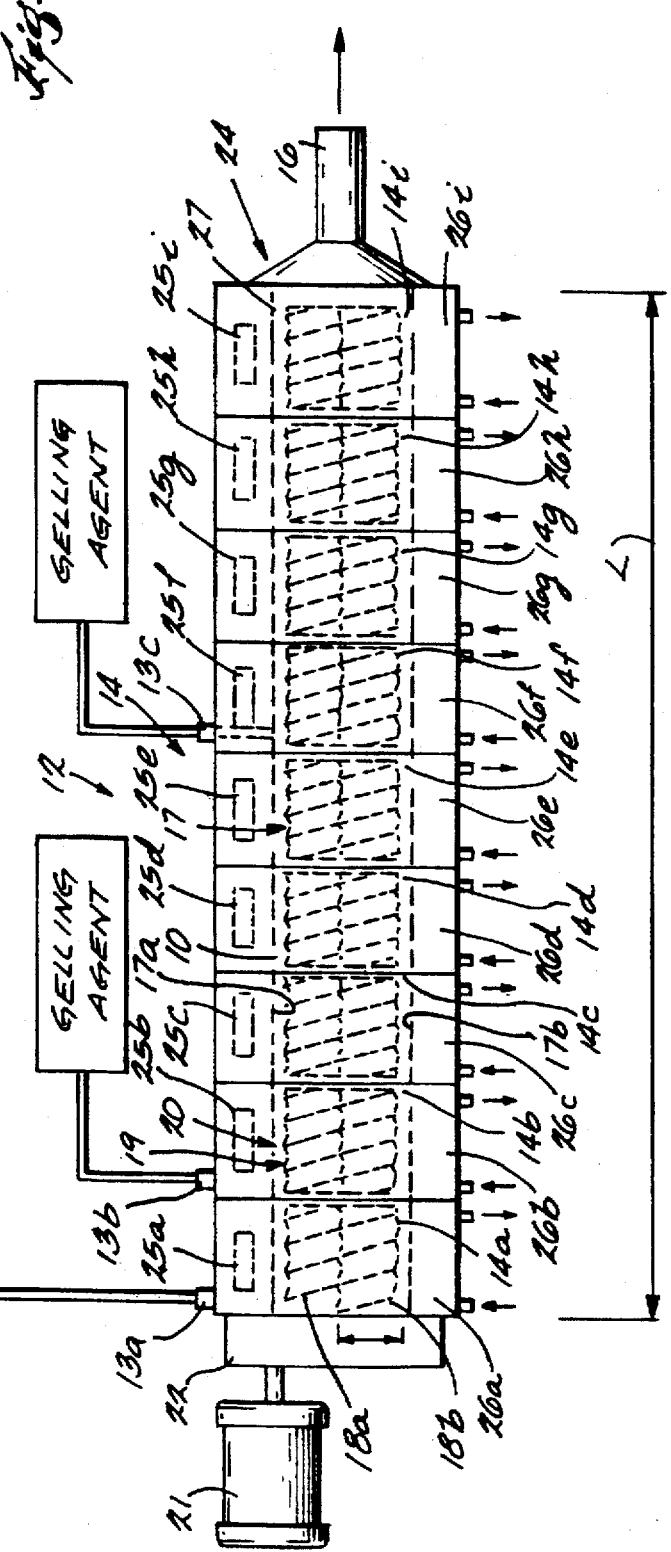
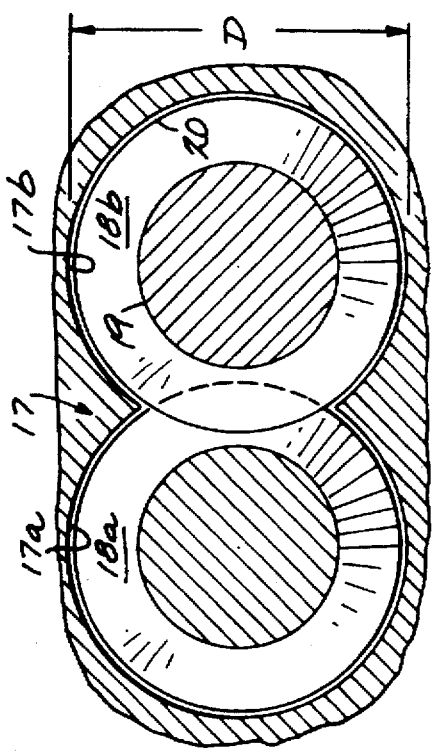
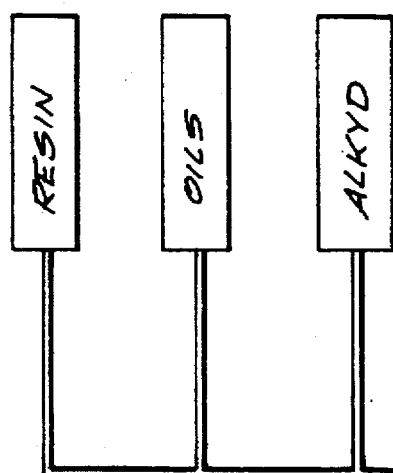

ced mixing and the large volume of material.

METHOD FOR CONTINUOUS PRODUCTION OF VARNISH

This application is a continuation-in-part of application Ser. No. 08/603,203, filed Feb. 20, 1996, and application Ser. No. 08/278,403, filed Jul. 21, 1994 now abandoned.

BACKGROUND OF THE INVENTION

1. Field of the Invention

The present invention relates generally to a method for producing varnish. More particularly, the invention relates to a method for the continuous production of varnish.

2. Reference to Prior Art

Varnish is typically produced in batches of 1,000 to 20,000 pounds in large, heated kettles. The kettle typically includes a mechanical mixing device, such as a set of stirring blades or a set of high speed dispersion blades, driven by a motor of about 50 to 100 horsepower. Raw materials, such as dry resins, oils and alkyds, are introduced into the varnish kettle, and the mixture is mixed and heated to about 320°–340° F. Typically, a blanket of nitrogen gas is introduced into the kettle to prevent air from contacting the mixture. After the mixture becomes a uniform resin solution and has reached the appropriate temperature, e.g. about 320° F., a gelling agent such as an aluminum chelate is slowly introduced, typically over about a 15 minute period. Chemical reactions occur between the resin and gelling agent to produce varnish. As used herein, "varnish" means the reaction product of such reactions. In order to produce a substantial amount of varnish, the reaction mixture is heated and mixed in the kettle for an extended period of time, typically about 1 to 1½ hours or longer. During the reactions, substantial amounts of volatile organic compounds are produced and must be treated or recovered. When a sufficient amount of varnish is produced, the varnish is drained from the kettle, cooled and stored for later use. Most frequently, the varnish is drained from the kettle into 55 gallon drums, and permitted to cool in the drums at ambient conditions. In other arrangements, as the varnish is drained from the kettle, it passes through a heat exchanger where it is cooled to about 150°–175° F. From the heat exchanger, the partially cooled varnish is introduced into bulk packages and permitted to further cool at ambient conditions. Producing a batch of varnish in a kettle, including weighing and introducing raw materials into the kettle, heating and mixing the materials, and emptying the varnish from the kettle, typically requires a period of about 6 to 10 hours.

SUMMARY OF THE INVENTION

A problem in prior art batch processes for making varnish is that varnish produced by such processes has a composition and physical properties which may vary substantially within each batch and between different batches. This problem can be caused in part by: poor conditions for heat transfer through the kettle wall and into the large volume of material; inefficient and inconsistent mixing of the large volume of material; thermal gradients in the large volume of material; introduction of a relatively small amount of the gelling agent into a large volume of material over an extended period; and, emptying a batch from the kettle typically requires an extended period of time, such that the material remaining in the kettle continues to react during the emptying process, so different portions of the material react for different periods of time.

Another problem in prior art batch processes is that the heating and mixing period required to produce a substantial amount of varnish is relatively long, typically about 3 to 5 hours. This includes a period to heat the material to reaction temperature, and a period of about 1 to 1½ hours for mixing the material at reaction temperature. This problem is due in part to relatively inefficient and incomplete mixing in the large volume of material.

Another problem in the prior art is that the production of varnish in large kettles requires a relatively high expenditure of energy.

A further problem in prior art batch processes is that substantial amounts of volatile organic compounds are emitted from the reaction mixture, and must be recovered or treated.

The invention provides a method for the production of varnish. According to the invention, resin, oil and a gelling agent are continuously introduced into the mixing zone of an extruder, heated to an elevated temperature, and mixed for a period sufficient to produce varnish. A reaction mixture including varnish is continuously withdrawn from the mixing zone. The reaction mixture is continuously introduced into a cooling zone, wherein the reaction mixture is cooled to stop the production of varnish. The cooled reaction mixture is continuously withdrawn from the cooling zone.

The invention provides a method for producing varnish having more uniform composition and physical properties than varnish produced in large batch processes.

The invention also provides a method for producing varnish in a shorter mixing period than in batch processes.

The invention also provides a method for producing varnish with less energy expenditure than in batch processes.

The invention also provides a method for producing varnish with lower emissions of volatile organic compounds than in batch processes.

Other features and advantages of the invention will become apparent to those skilled in the art upon review of the following detailed description, claims and drawings.

BRIEF DISCUSSION OF THE DRAWING

FIG. 1 is a schematic diagram illustrating a method for the continuous production of varnish.

FIG. 2 is an enlarged partial cross sectional view taken generally along line 2—2 in FIG. 1, illustrating the orifice and screws.

DETAILED DESCRIPTION OF A PREFERRED EMBODIMENT

Figure 3:
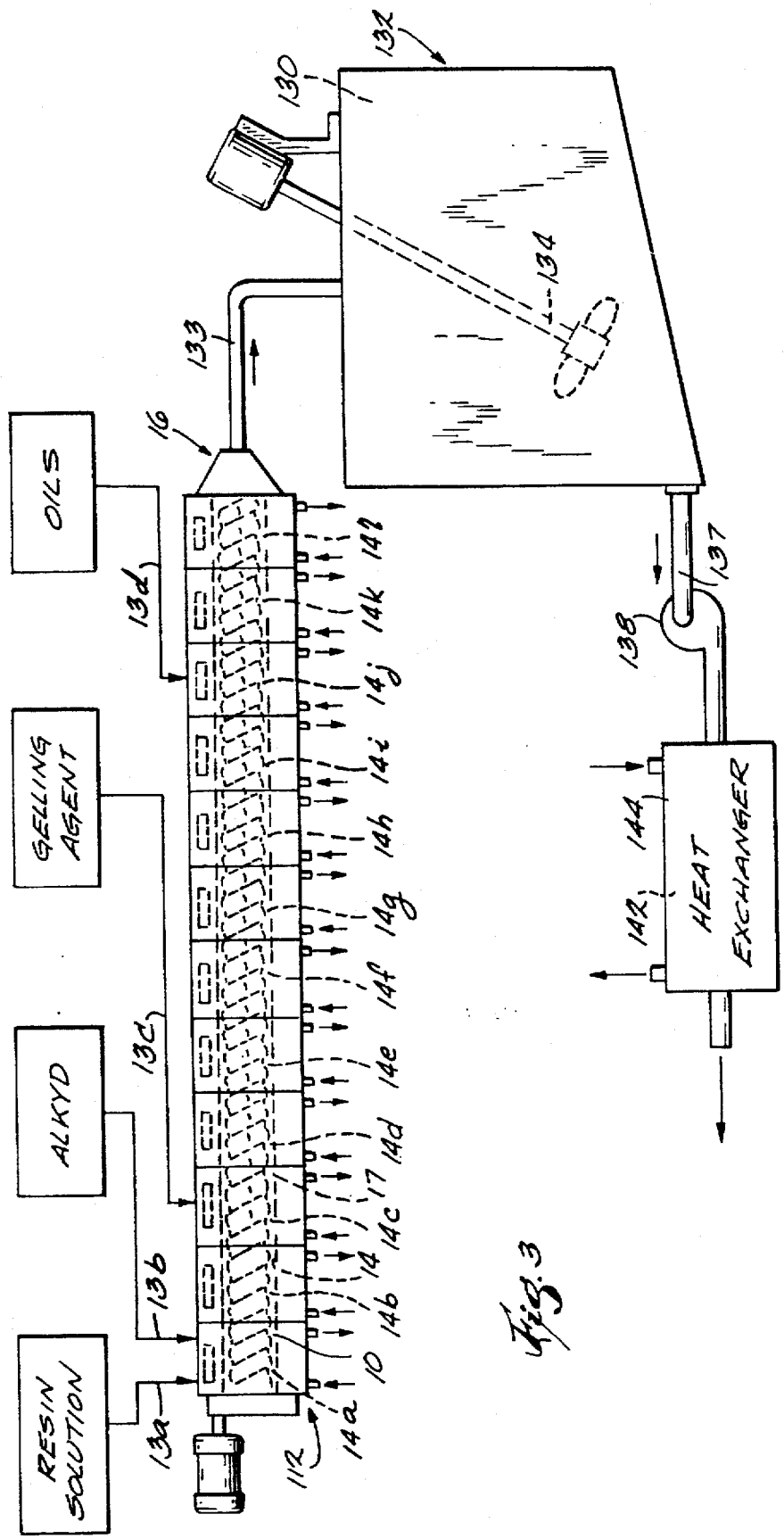
FIG. 3 is a schematic illustration of a method which is a second embodiment of the invention.

FIG. 1 illustrates a method for the continuous production of varnish. In one embodiment, the invention is suitable for producing varnish for use in heatset printing ink, and will be described in connection with the production of such varnish. Varnish for use in heatset printing ink typically is produced from raw materials including resins, oils, alkyds and an aluminum chelate gelling agent. The specific raw materials and amounts of the raw materials vary according to the requirements of the specific printing process in which the ink will be used. A method of the invention is suitable for producing varnishes having different compositions from different raw materials for a wide variety of applications.

According to the invention, varnish is produced in apparatus including a mixing zone 10. As used herein, "mixing zone" means a zone wherein raw materials are continuously introduced and subjected to turbulent mixing, and a reaction mixture including varnish is continuously removed. In the illustrated embodiment, the mixing zone 10 is a mixing zone of an extruder 12. In other embodiments of the invention, the mixing zone can be defined in another suitable continuous flow reactor, such as a continuous barrel mixer. In other embodiments, the mixing zone can be defined in a continuous flow mixer including static mixing elements such as beryl saddles, rashig rings or other suitable packing, or hydrodynamic mixing elements of various designs.

In the illustrated embodiment, the extruder 12 is a twin screw extruder including inlets 13a, 13b and 13c, a barrel 14 defining an orifice 17 in communication with the inlets, and an outlet 16 in communication with the orifice 17. A suitable commercially available extruder is the ZSK-30 marketed by Werner & Pfleiderer Corporation (Ramsey, N.J.). In the specific embodiment illustrated, the barrel 14 consists of nine successive barrel sections 14a–14i. Also in the specific embodiment illustrated, the mixing zone 10 is defined in the first seven barrel sections 14a–14g. The orifice 17 has a length L, which in the specific embodiment illustrated is 134 centimeters. The length L can be different to provide a longer or shorter mixing period than specifically illustrated. As best shown in FIG. 2, the orifice 17 includes two generally cylindrical portions 17a and 17b for receiving respective screws 18a and 18b. The cylindrical portions 17a and 17b are arranged in side-by-side overlapping relation. Each portion 17a and 17b has a diameter D, which in the specific embodiment illustrated is 30.85 millimeters.

In the specific embodiment illustrated, a pair of intermeshing, co-rotating screws 18a and 18b are rotatably supported in side-by-side relation in the orifice 17. In the illustrated embodiment, each screw 18a or 18b consists of a plurality of interconnected sections or elements (not shown). Each screw 18a or 18b is a helical element having a root portion 19 and a thread portion 20. The root portion 19 has a diameter, which in the illustrated embodiment is 21.3 millimeters. The thread portion 20 has an an outer diameter, which in the illustrated embodiment is 30.7 millimeters. Although in other embodiments the screws can have different threads, in the illustrated embodiment each screw 18a or 18b includes right hand thread. Thus, in the illustrated embodiment the free volume of the orifice 17 is 447.5 $cm^3$ per meter of length, such that the total free volume of the orifice 17 is about 600 $cm^3$. The screws 18a and 18b are rotatably driven by a drive motor 21 connected to the screws through a gear box 22. In the specific embodiment illustrated, the drive motor 21 is a 15 horsepower electric motor. The drive motor 21 includes suitable control means, which in the illustrated embodiment is a variable speed controller (not shown). In the illustrated embodiment, the drive motor 21 can be operated to rotate the screws between about 1 and 500 revolutions per minute. In one embodiment, the screws are rotated between about 100 and 500 revolutions per minute. In one embodiment, the screws are rotated about 500 revolutions per minute. The screws 18a and 18b rotate in the direction counter to the thread direction (viewed from the drive motor 21, the screws 18a and 18b rotate counterclockwise). Thus, in the specific embodiment illustrated, the helical screws 18a and 18b cooperate to define a single mixing zone 10 in the first seven barrel sections 14a–14g. In other embodiments, the screws can include other suitable combinations of kneading elements, conveying elements, left hand threaded elements and threaded screw elements to define different mixing zones and thus provide a mixing profile suitable for producing varnish having different properties.

The extruder 12 also includes means 24 for controlling the temperature in the barrel 14. In the illustrated embodiment, the temperature control means 24 includes sets of electric heating elements 25a–25i and a heat exchanger 26 jacketed around the barrel 14 of the extruder 12. Each set of electric elements 25a–25i corresponds to a barrel section 14a–14i and is independently controllable for controlling the temperature of the corresponding barrel section. The heat exchanger 26 includes nine sections 26a–26i corresponding to the barrel sections 14a–14i. Each heat exchanger section 26a–26i is independently controllable for controlling the temperature of the corresponding barrel section. A heat exchange fluid, such as steam, oil or coolant, is introduced into each heat exchanger section 26a–26i to control the temperature of the respective barrel section 14a–14i. In the specific embodiment illustrated, the sets of electric elements 25a–25i and heat exchanger sections 26a–26i can be operated together to independently control the temperature of each barrel section. In the illustrated embodiment, the first seven sets of electric elements 25a–25g and heat exchanger sections 26a–26g are operated to provide a substantially uniform elevated temperature in barrel sections 14a–14g, such that the entire mixing zone 10 is maintained at a substantially uniform temperature. As further described below, the last two heat exchanger sections 26h–26i are operated to define a cooling zone 27. In other embodiments, different barrel sections can be maintained at different temperatures to provide a temperature profile suitable for producing varnish having different properties.

The apparatus includes a cooling zone 27 in communication with the mixing zone 10. In the illustrated embodiment, the cooling zone 27 is defined in the last two barrel sections 14h–14i. A heat exchange fluid is introduced into heat exchanger sections 26h–26i to cool the reaction mixture in barrel sections 14h–14i. In the specific embodiment illustrated, the heat exchange fluid is water, which enters heat exchanger sections 26h–26i at about 60° F. Since cooling is required, the electric heating elements 25h–25i are not operated. In other embodiments, the cooling zone 27 can be defined in an agitated heat exchanger in communication with the extruder outlet 16. In the various embodiments, the cooling zone should be agitated to prevent varnish from cooling to form a highly viscous layer on the inner surface of the apparatus defining the cooling zone, because such a layer substantially reduces heat transfer efficiency. Formation of such a layer can be minimized by agitating the reaction mixture in the cooling zone, such as by the rotating screws in the extruder or in the agitated heat exchanger in the described alternative embodiment.

In one embodiment of the invention, varnish is produced by: (a) continuously introducing resin, oil, a gelling agent and an alkyd into the mixing zone 10 of an extruder 12; (b) heating the resin, oil, gelling agent and alkyd to an elevated temperature of at least about 320° F.; (c) mixing the resin, oil, gelling agent and alkyd at elevated temperature for a period sufficient to produce a reaction mixture including varnish; (d) continuously withdrawing the reaction mixture from the mixing zone 10; (e) continuously introducing the reaction mixture into the cooling zone 27 to cool the reaction mixture and thus stop the reactions producing varnish; and (f) continuously withdrawing the cooled reaction mixture from the cooling zone 27. In other embodiments, steps (e) and (f) can be omitted, and the reaction mixture can be allowed to cool at ambient conditions.

Resin is continuously introduced into the extruder 12. In the illustrated embodiment, the resin is introduced into the first barrel section 14a of the extruder 12. In other embodiments, the resin can be introduced into a different barrel section. Although the resin can be in dry form, in the illustrated embodiment the resin is a liquid solution. The liquid resin solution can include any resins commonly used in the production of varnish, and in the illustrated embodiment includes a mixture of hydrocarbon resin, phenolic resin and maleic resin. In other embodiments, the resin can include elastic resins, and if such elastic resins are used, the gelling agent may be reduced or eliminated. In the illustrated embodiment, the liquid resin solution also includes Magie oil and alkyd. The amount of liquid resin solution introduced into the extruder is metered and controlled, as are all other materials introduced into the extruder 12. In one embodiment, the amount of liquid resin solution is about 80% by weight, based upon the total weight of the materials introduced into the extruder during a period. In one embodiment, the liquid resin solution includes about 63% by weight of dry resin.

Oil is also continuously introduced into the extruder 12. In the illustrated embodiment, the oil is introduced with the resin into the first barrel section 14a. In other embodiments, the oil can be introduced in a different barrel section. As used herein, "oil" means any additive, including suitable fluids, solvents, and non-petroleum distillates, which can provide a diluting or solvating effect on the other ingredients. It is believed that the oil acts as a solvent for the resins and other ingredients in the reaction mixture and varnish. The oil can also affect the rheological properties, non-volatilizing properties, drying properties, curing properties or other properties of the reaction mixture and varnish. Although any suitable oil can be used, in the illustrated embodiment the oil consists of a mixture of "Magie oils" commonly used in the production of varnish for heatset printing ink. In another embodiment, the oil can consist of a mixture of Magie oils and vegetable oil, such as corn, soy or linseed oil. "Magie oil" is a trade name for a family of liquid mixtures of aliphatic hydrocarbons available in a variety of boiling point ranges and marketed under the trademark "Magiesol®" by Magie Bros, Franklin Park, Ill. In one embodiment, the amount of oil is about 40% by weight, based upon the total weight of the materials introduced into the extruder during a period.

A gelling agent is also continuously introduced into the extruder 12. In the specific embodiment illustrated, the gelling agent is introduced into the second barrel section 14b and the sixth barrel section 14f. In other embodiments, the gelling agent can be introduced into different barrel sections or a single barrel section. As used herein, "gelling agent" includes any compound which crosslinks the resinous system through primary covalent bonds and secondary van Der Waals bonds, or otherwise creates a crosslinked network of resin molecules and gel-modified resin molecules. It is believed that the gelling agent reacts with the resin, primarily in polymerization reactions, to produce varnish. Although any suitable gelling agent can be used, in the illustrated embodiment the gelling agent is an aluminum chelate. In one embodiment, the total amount of the gelling agent is about 1% by weight, based upon the total weight of the materials introduced into the extruder during a period. Although the gelling agent can be stored and introduced differently, in the illustrated embodiment the gelling agent is stored and introduced in a 50% solution (by weight) of Magie oil.

An alkyd is also introduced into the extruder 12. In the illustrated embodiment, the alkyd is mixed into the liquid resin solution before the solution is introduced into the extruder, and thus is introduced into the first barrel section 14a of the extruder 12. In other embodiments, the alkyd can be introduced in a different manner or barrel section. In still other embodiments, the alkyd can be omitted. As used herein, "alkyd" includes a group of synthetic resins formed by condensation of polyfunctional acids or diisocyanates with polyhydric alcohols. It is believed that the alkyd acts as a solvating or coupling agent assisting in keeping the various materials in solution. It is also believed that the alkyd affects the rheological properties, non-volatilizing properties, drying properties, curing properties and other properties of the reaction mixture and varnish. In one embodiment, the amount of alkyd is about 9% by weight, based upon the total weight of the materials introduced into the extruder during a period.

In other embodiments, various additives can be introduced to provide desired varnish properties for different applications.

In the illustrated embodiment, the liquid resin solution, oil and alkyd are continuously introduced together into the first section 14a of the extruder barrel. The gelling agent is introduced into the second barrel section 14b and sixth barrel section 14f. Thus, the resin, oil, alkyd and gelling agent are continuously introduced into the mixing zone 10 defined in barrel sections 14a–14g.

In the mixing zone 10 of the extruder, the resin, oil, alkyd and gelling agent are heated to a temperature of at least about 320° F. and subjected to a pressure of about 1 to 580 psi. In other embodiments, the temperature and pressure can vary, depending upon a variety of factors, such as the identity and relative amounts of the raw materials, the desired properties of the varnish, and the length of the mixing period. The invention is suitable for producing varnish at temperatures and pressures which are different from those specifically illustrated. Although reactions between the resin and gelling agent typically occur at temperatures between 320°–340° F. at about ambient or slightly greater pressure, the invention allows the use of significantly higher temperatures and pressures. For instance, it is believed that the temperature in the extruder can be raised above 400° F., and at least as high as about 430°–460° F., without causing substantial degradation of the raw materials, reaction mixture or varnish. As used herein, "temperature" refers to the temperature of the bulk material, as distinguished from the local temperature of material in the immediate vicinity of the barrel wall or mixing screws. Substantially higher local temperatures can be measured at the wall or screws. In one embodiment, heating the materials to a temperature of at least about 390° F. provides a medium to low gel varnish. In another embodiment, heating the materials to a temperature of at least about 460° F. provides a heavy gel varnish. As used herein, "gel" means the degree to which the resinous system is gelled or crosslinked and, although the viscosity of the varnish can change over time, also refers to the apparent viscosity of the varnish. The invention also permits the use of different pressures. In one embodiment, the pressure is from about 100 to 580 psi. Also, although in the illustrated embodiment the pressure in the extruder is limited to about 580 psi, in other embodiments the pressure can exceed 580 psi.

In the mixing zone 10, the rotating, intermeshing screws 18 provide turbulent mixing of the resin, oil, alkyd and gelling agent at elevated temperature. In the specific embodiment illustrated, the temperature is at least about 330° F. As used herein, "turbulent mixing" means mixing comparable in degree to the mixing provided in an extruder including twin helical screws co-rotating at least about 100 revolutions per minute, or mixing which is otherwise suitable to convert a substantial amount of reactants to varnish at an elevated temperature in a period of about 5 seconds to 10 minutes. It is believed that "turbulent mixing" also means that the Reynolds number or Reynolds number group, adjusted for the geometry of the orifice and screws, exceeds the critical value throughout substantially the entire free volume of the orifice. Although it is believed that in the specific embodiment illustrated, turbulent mixing occurs at elevated temperature when the screws are rotated at least about 100 rpm, it is contemplated within the scope of the invention that turbulent mixing could be achieved at lower rotational speeds.

The resin, oil, alkyd and gelling agent are mixed at the elevated temperature for a period sufficient to convert a substantial amount of the resin and gelling agent to varnish, and thus produce a reaction mixture including varnish. According to the invention, a mixing period between about 5 seconds and about 10 minutes, preferably about 5 seconds and 5 minutes, more preferably about 5 seconds and 2 minutes, and most preferably about 10 seconds and 90 seconds, is sufficient to produce adequately gelled varnish. In the specific embodiment illustrated, a mixing period of about 15 seconds is sufficient to produce adequately gelled varnish. As used herein, "adequately gelled varnish" means varnish which is suitable for use in heatset printing ink, or in any other intended use of the varnish. In other embodiments, the degree of gelling of the varnish can vary as required for different uses of the varnish. For instance, both high and low gel varnishes can be produced according to the invention. In the specific embodiment illustrated, about 25 to 300 pounds of varnish is produced per hour. In one embodiment, about 100 pounds of varnish is produced per hour.

The reaction mixture including varnish is continuously withdrawn from the mixing zone 10 and continuously introduced into the cooling zone 27 defined in barrel sections 14h–14i. In the cooling zone 27, the reaction mixture is cooled to a temperature less than about 150° F. to stop the reactions producing varnish. In other embodiments, the temperature at which the reactions are stopped can be different. As used herein, the reactions are "stopped" when the rate of production of varnish is reduced to an insubstantial amount. The cooled reaction mixture is continuously withdrawn from the cooling zone 27 through the extruder outlet 16 and introduced into storage containers (not shown) for later use. In the specific embodiment illustrated, the cooled reaction mixture is stored at a temperature of about 150° F., such that the reaction mixture can be pumped for later use. In other embodiments, the reaction mixture is permitted to cool at ambient conditions in the storage containers. In other embodiments, the cooling zone 27 can be defined in an agitated heat exchanger in communication with the extruder outlet 16. In other embodiments, the reaction mixture can be introduced into storage containers without passing through a cooling zone.

Varnish produced according to the invention has a more uniform composition and physical properties than varnish produced in large batches in kettles. It is believed that the composition and physical properties are consistent and uniform because the extruder provides a consistent and controlled temperature and mixing profile to the materials. It is also believed that the extruder provides heat transfer which is superior to a kettle, primarily because the ratio of surface area to volume of material is much greater than in a kettle, and because the materials are better mixed, resulting in increased convection. It is believed that the extruder provides superior mixing, primarily because the volume of material to be mixed is drastically less than in a kettle; the mixing energy input from the rotating screws to the materials is large in relation to the volume of material to be mixed; the surface area of the screws is large in relation to the volume of material being mixed; and the materials are confined in a relatively small volume. The extruder also provides for introduction of the gelling agent at a constant rate over a very short mixing period, into a relatively small volume of material. The extruder also provides a more uniform reaction period than a kettle, because the raw materials are continuously introduced into the mixing zone, and the reaction mixture including varnish is continuously withdrawn from the mixing zone and introduced into the cooling zone.

Varnish is produced according to the invention in a shorter mixing period than in large batches in kettles. According to the invention, varnish is produced in a mixing period between about 5 seconds and 10 minutes, which is much shorter than typical kettle reaction periods of about 1 to 1½ hours or longer. It is believed that varnish is produced in a shorter period because the extruder provides mixing conditions which are superior to a kettle, and the extruder subjects the bulk of the materials to higher temperatures than a kettle.

The invention is suitable for producing varnish with less energy expenditure than in large batch processes. It is believed that less energy is required because the mixing period in the extruder is much shorter than in a kettle, and because heat transfer and mixing are more efficient than in a kettle.

The invention is also suitable for producing varnish with lower emissions of volatile organic compounds than in large batch processes. It is believed that lower emissions are due to the mixing period being much shorter than in a kettle, and the mixing and cooling zones being closed to the atmosphere.

The invention is also suitable for producing varnish without requiring a nitrogen blanket to prevent the reactants from contacting air, because the mixing zone and cooling zone are closed to the atmosphere.

Illustrated in FIG. 3 is an apparatus 100 which is an alternative embodiment of the invention. The apparatus 100 is similar to the previously-described apparatus (FIGS. 1–2), and corresponding elements are identified by the same reference numbers. The apparatus 100 is suitable for producing varnish for use in heatset printing ink, and will be described in connection with the production of such varnish. Varnish for use in heatset printing ink typically is produced from raw materials including resins, oils, alkyds and a gelling agent. The specific raw materials and amounts of the raw materials vary according to the requirements of the specific printing process in which the ink will be used.

The apparatus 100 includes a mixing zone 10. As used herein, "mixing zone" means a zone wherein raw materials are continuously introduced, heated to an elevated temperature and subjected to turbulent mixing such that chemical reactons occur which produce varnish, and a reaction mixture including varnish is continuously removed. In the illustrated embodiment, the mixing zone 10 is a mixing zone of an extruder 112. In the embodiment illustrated in FIG. 3, the extruder 112 is a twin screw extruder. Except as otherwise described, the extruder 112 is identical to the extruder 12. A suitable commercially available extruder is the ZSK-30 marketed by Werner & Pfleiderer Corporation (Ramsey, N.J.). The extruder 112 includes four inlets 13a, 13b, 13c and 13d, a barrel 14 defining an orifice 17 in communication with the inlets, and an outlet 16 in communication with the orifice 17. In the specific embodiment illustrated, the barrel 14 consists of twelve successive barrel sections 14a–14l which cooperate to define the mixing zone 10. The extruder 12 otherwise is identical to the extruder previously described (FIGS. 1-2). The extruder 12 includes sets of electric heating elements (not shown) and a heat exchanger (not shown) jacketed around the barrel, which also are identical to the same elements in the previously described apparatus. The extruder includes electric elements and heat exchanger sections which are operated to provide an elevated temperature in the mixing zone 10.

The apparatus includes a holding zone 130 in communication with the mixing zone 10. The varnish is continuously withdrawn from the mixing zone 10 and is continuously introduced into the holding zone 130. In the illustrated embodiment, the holding zone 130 is defined by an agitated, insulated vessel 132. In the specific embodiment illustrated, the vessel 132 has a volume of about 3-4 gallons. In an alternative embodiment of the invention, the holding zone can be defined by another suitable apparatus, such as a scraped surface heat exchanger. The vessel 132 is connected to the outlet of the extruder 12 by a conduit 133. The vessel 132 is insulated and thus maintains the varnish at substantially the same temperature which is reached when the varnish is removed from the mixing zone 10. In the illustrated embodiment, the varnish reaches a temperature of about 320 F. while in the vessel 132. The vessel 132 includes an agitator 134 which is operable to prevent the varnish from agglomerating into a mass. In the illustrated embodiment, the agitator 134 is a spiral paddle having a diameter of about 2" and a height of about 2.5" and which is operated at about 300 rpm.

The apparatus 100 also includes a pump 138 which is in communication with the outlet of the vessel 132 and with a heat exchanger 140 (further described below) via a conduit 137 for moving the varnish through the heat exchanger 140. In the illustrated embodiment, the pump 138 is a gear-type metering pump.

The apparatus 100 also includes a cooling zone 142 which is in communication with the holding zone 130 via the pump 138 and conduit 137. The varnish is continuously withdrawn from the holding zone 130 and is continuously introduced into the cooling zone 142. In the illustrated embodiment, the cooling zone 142 is defined by a scraped surface heat exchanger 144. In the illustrated embodiment, water at 68 F. is introduced into the heat exchanger 144 to cool the varnish. In the heat exchanger 144, the varnish is cooled to less than about 175 F. to stop the reactions producing varnish. In the specific embodiment illustrated, the varnish is cooled to about 120 F. The cooled varnish is continuously withdrawn from the heat exchanger 144 and is introduced into storage containers (not shown) for later use. In the specific embodiment illustrated, the varnish is cooled to about 48 C. and then introduced into storage containers and permitted to cool at ambient conditions in the storage containers.

An exemplary method of producing varnish in the apparatus 100 will now be described. The resin solution is continuously introduced into the first barrel section 14a of the extruder 12. In the illustrated embodiment, the resin includes a mixture of hydrocarbon resin and elastic phenolic resin. In the specific embodiment illustrated, the amount of liquid resin solution is about 70% by weight, based upon the total weight of the materials introduced into the extruder, and the liquid resin solution includes about 70% by weight of dry resin. The remaining 30% of the solution consists of Magie oil.

A gelling agent is also continuously introduced into the extruder 12. In the specific embodiment illustrated, the gelling agent is introduced into the third barrel section 14c. As used herein, "gelling agent" includes any compound which crosslinks the resinous system through primary covalent bonds and secondary van Der Waals bonds, or otherwise creates a crosslinked network of resin molecules and gel-modified resin molecules. It is believed that the gelling agent reacts with the resin, primarily in polymerization reactions, to produce varnish. Although any suitable gelling agent can be used, in the illustrated embodiment the gelling agent is OAO (oxyaluminum acylate) (Chattem Chemicals). Although the gelling agent can be introduced differently, in the illustrated embodiment the gelling agent is introduced in a 30% solution (by weight) of oil. In the specific embodiment illustrated, the gelling agent solution is shipped from the supplier (Chattem Chemicals, Chattanooga) in a solution containing 60% OAO and 40% Telura 607™ (Exxon, Houston, Tex.), and then diluted with Magie oil. Telura 607™ is an extracted parafinic oil having a viscosity of less than 10 centistokes. The 60/40 OAO/Telura 607™ shipping solution is blended or diluted in an equal amount of Magie oil to produce the gelling agent solution (30% OAO/20% Telura 607™/50% Magie oil) which is introduced into barrel section 14b. In one embodiment, the total amount of the gelling agent solution is about 4% by weight, based upon the total weight of the materials introduced into the extruder during a period. Accordingly, the total amount of OAO introduced into the reaction mixture is about 1.2% by weight, based upon the total weight of the materials introduced into the extruder during a period.

An alkyd also is introduced into the first barrel section 14a of the extruder 12. In the illustrated embodiment, the alkyd is introduced as a 70% solution (by weight) of Magie oil. In one embodiment, the total amount of the alkyd solution is about 7% by weight, based upon the total weight of the materials introduced into the extruder during a period. Accordingly, in the specific embodiment illustrated, the total amount of alkyd is about 4.9%, based upon the total weight of the materials introduced into the extruder during a period. In the specific embodiment illustrated, the alkyd is isothalic alkyd no. 7 (Lawter International; Pleasant Prairie, Wis.). In another embodiment, the alkyd can be omitted. As used herein, "alkyd" includes a group of synthetic resins formed by condensation of polyfunctional acids or diisocyanates with polyhydric alcohols. It is believed that the alkyd acts as a solvating or coupling agent assisting in keeping the various materials in solution, and may also participate in the crosslinking network.

Oil is also continuously introduced into the extruder 12. In the illustrated embodiment, the oil is introduced into the tenth barrel section 14j. In other embodiments, the oil can be introduced in a different barrel section. As used herein, "oil" means any additive, including suitable fluids, solvents, and non-petroleum distillates, which can provide a diluting or solvating effect on the other ingredients. Although any suitable oil can be used, in the illustrated embodiment the oil consists of a mixture of Magie oil 47, Magie oil 52 and alkali refined linseed oil (ARLO) commonly used in the production of varnish for heatset printing ink. In the illustrated embodiment, the amount of the oil mixture is about 19% by weight, based upon the total weight of the materials introduced into the extruder. This amount is in addition to oil which is included in the resin solution, gelling agent solution, and alkyd solution.

In other embodiments, various additives can be introduced to provide desired varnish properties for different applications.

In the mixing zone 10 of the extruder 112, the resin, oil, alkyd and gelling agent are heated to a temperature of at least about 320° F. and subjected to a pressure of about 1 to 580 psi. In other embodiments, the temperature and pressure can vary, depending upon a variety of factors, such as the identity and relative amounts of the raw materials, the desired properties of the varnish, and the length of the mixing period. The invention is suitable for producing varnish at temperatures and pressures which are different from those specifically illustrated. Although reactions between the resin and gelling agent typically occur at temperatures between 320°–340° F. at about ambient or slightly greater pressure, the invention allows the use of significantly higher temperatures and pressures. For instance, it is believed that the temperature in the extruder can be raised above 400° F., and at least as high as about 430°–460° F., without causing substantial degradation of the raw materials, reaction mixture or varnish. As used herein, "temperature" refers to the temperature of the bulk material, as distinguished from the local temperature of material in the immediate vicinity of the barrel wall or mixing screws. Substantially higher local temperatures can be measured at the wall or screws. In one embodiment, heating the materials to a temperature of at least about 390° F. provides a medium to low gel varnish. In another embodiment, heating the materials to a temperature of at least about 460° F. provides a heavy gel varnish. As used herein, "gel" means the degree to which the resinous system is gelled or crosslinked and, although the viscosity of the varnish can change over time, also refers to the apparent viscosity of the varnish. The invention also permits the use of different pressures. In one embodiment, the pressure is from about 100 to 580 psi. Also, although in the illustrated embodiment the pressure in the extruder is limited to about 580 psi, in other embodiments the pressure can exceed 580 psi.

In the mixing zone 10, the rotating, intermeshing screws provide turbulent mixing of the resin, oil, alkyd and gelling agent at elevated temperature. In the specific embodiment illustrated, the temperature is at least about 330° F. As used herein, "turbulent mixing" means mixing comparable in degree to the mixing provided in an extruder including twin helical screws co-rotating at least about 100 revolutions per minute, or mixing which is otherwise suitable to convert a substantial amount of reactants to varnish at an elevated temperature in a period of about 5 seconds to 10 minutes. It is believed that "turbulent mixing" also means that the Reynolds number or Reynolds number group, adjusted for the geometry of the orifice and screws, exceeds the critical value throughout substantially the entire free volume of the orifice. Although it is believed that in the specific embodiment illustrated, turbulent mixing occurs at elevated temperature when the screws are rotated at least about 100 rpm, it is contemplated within the scope of the invention that turbulent mixing could be achieved at lower rotational speeds.

The resin, oil, alkyd and gelling agent are mixed at the elevated temperature in the mixing zone 10 for a period sufficient to convert a substantial amount of the resin and gelling agent to varnish, and thus to produce a reaction mixture including varnish. According to the invention, a mixing period between about 5 seconds and about 10 minutes, preferably about 5 seconds and 5 minutes, more preferably about 5 seconds and 2 minutes, and most preferably about 10 seconds and 90 seconds, is sufficient to produce adequately gelled varnish. In the specific embodiment illustrated, a mixing period of about 15 seconds is sufficient to produce adequately gelled varnish. As used herein, "adequately gelled varnish" means varnish which is suitable for use in heatset printing ink, or in any other intended use of the varnish. In other embodiments, the degree of gelling of the varnish can vary as required for different uses of the varnish. For instance, both high and low gel varnishes can be produced according to the invention. In the specific embodiment illustrated, about 250 to 350 pounds of varnish is produced per hour.

The reaction mixture including varnish is continuously withdrawn from the mixing zone 10 and continuously introduced into the holding zone 130. In the holding zone 130, the reaction mixture including varnish reaches a temperature of about 320 F. In the illustrated embodiment, the residence period in the holding zone 130 is about 7 minutes.

The varnish is continuously withdrawn from the holding zone 130 introduced via the pump 138 into the cooling zone 142. In the cooling zone 142, the varnish is cooled to a temperature of about 120 F. The varnish is continuously withdrawn from the heat exchanger 144 and introduced into storage containers (not shown) for later use. In the specific embodiment illustrated, the varnish is stored at ambient temperature in storage containers.

Varnish produced according to the above-described embodiment of the invention can be produced at a very high rate. The varnish has a more uniform composition and physical properties than varnish produced in large batches in kettles, and is produced in a shorter mixing period than in large batches in kettles.

What is claimed is:

1. A method for the production of varnish, said method comprising the steps of:
   (a) continuously introducing resin, oil and a gelling agent into a mixing zone of an extruder;
   (b) heating the resin, oil, and gelling agent to a first elevated temperature in the mixing zone of the extruder;
   (c) mixing the resin, oil, and gelling agent under turbulent mixing conditions in the mixing zone of the extruder for a first period sufficient to produce varnish;
   (d) continuously withdrawing the varnish from the mixing zone of the extruder;
   (e) continuously introducing the varnish into a holding zone;
   (f) maintaining the varnish at an elevated temperature in the holding zone for a second period, the second period being longer than the first period; and
   (g) continuously withdrawing the varnish from the holding zone.

2. A method as set forth in claim 1 wherein in step (c) the period is less than about 10 minutes.

3. A method as set forth in claim 1 wherein in step (c) the period is less than about 5 minutes.

4. A method as set forth in claim 1 wherein in step (c) the period is less than about 2 minutes.

5. A method as set forth in claim 1 wherein in step (c) the period is less than about 90 seconds.

6. A method as set forth in claim 1 wherein in step (b) the resin, oil and gelling agent are heated to a temperature of at least about 320 F.

7. A method as set forth in claim 1 wherein in step (b) the resin, oil and gelling agent are heated to a temperature of at least about 400 F.

8. A method as set forth in claim 1 wherein in step (f) the period is at least about 5 minutes.

9. A method as set forth in claim 1 wherein in step (f) the period is at least about 7 minutes.

10. A method as set forth in claim 1 wherein in step (f) the elevated temperature is about 320 F.

11. A method for the production of varnish, said method comprising the steps of:

(a) continuously introducing resin, oil and a gelling agent into a mixing zone of an extruder;

(b) heating the resin, oil, and gelling agent to a first elevated temperature in the mixing zone of the extruder;

(c) mixing the resin, oil, and gelling agent under turbulent mixing conditions in the mixing zone of the extruder for a first period sufficient to produce varnish;

(d) continuously withdrawing the varnish from the mixing zone of the extruder;

(e) continuously introducing the varnish into a holding zone;

(f) maintaining the varnish at an elevated temperature in the holding zone for a second period, the second period being longer than the first period;

(g) continuously withdrawing the varnish from the holding zone;

(h) continuously introducing the varnish into a cooling zone and cooling the varnish in the cooling zone to stop the reactions producing varnish; and (i) continuously withdrawing the varnish from the cooling zone.

12. A method as set forth in claim 11 wherein in step (c) the period is less than about 10 minutes.

13. A method as set forth in claim 11 wherein in step (c) the period is less than about 5 minutes.

14. A method as set forth in claim 11 wherein in step (c) the period is less than about 2 minutes.

15. A method as set forth in claim 11 wherein in step (c) the period is less than about 90 seconds.

16. A method as set forth in claim 11 wherein in step (b) the resin, oil and gelling agent are heated to a temperature of at least about 320 F.

17. A method as set forth in claim 11 wherein in step (b) the resin, oil and gelling agent are heated to a temperature of at least about 400 F.

18. A method as set forth in claim 11 wherein in step (f) the period is at least about 5 minutes.

19. A method as set forth in claim 11 wherein in step (f) the period is at least about 7 minutes.

20. A method as set forth in claim 11 wherein in step (f) the elevated temperature is about 320 F.

21. A method as set forth in claim 11 wherein in step (h), the varnish is cooled to less than about 175 F.

* * * * *